Aug. 13, 1946.     R. STRUB     2,405,676
MARINE POWER PLANT
Filed May 1, 1944
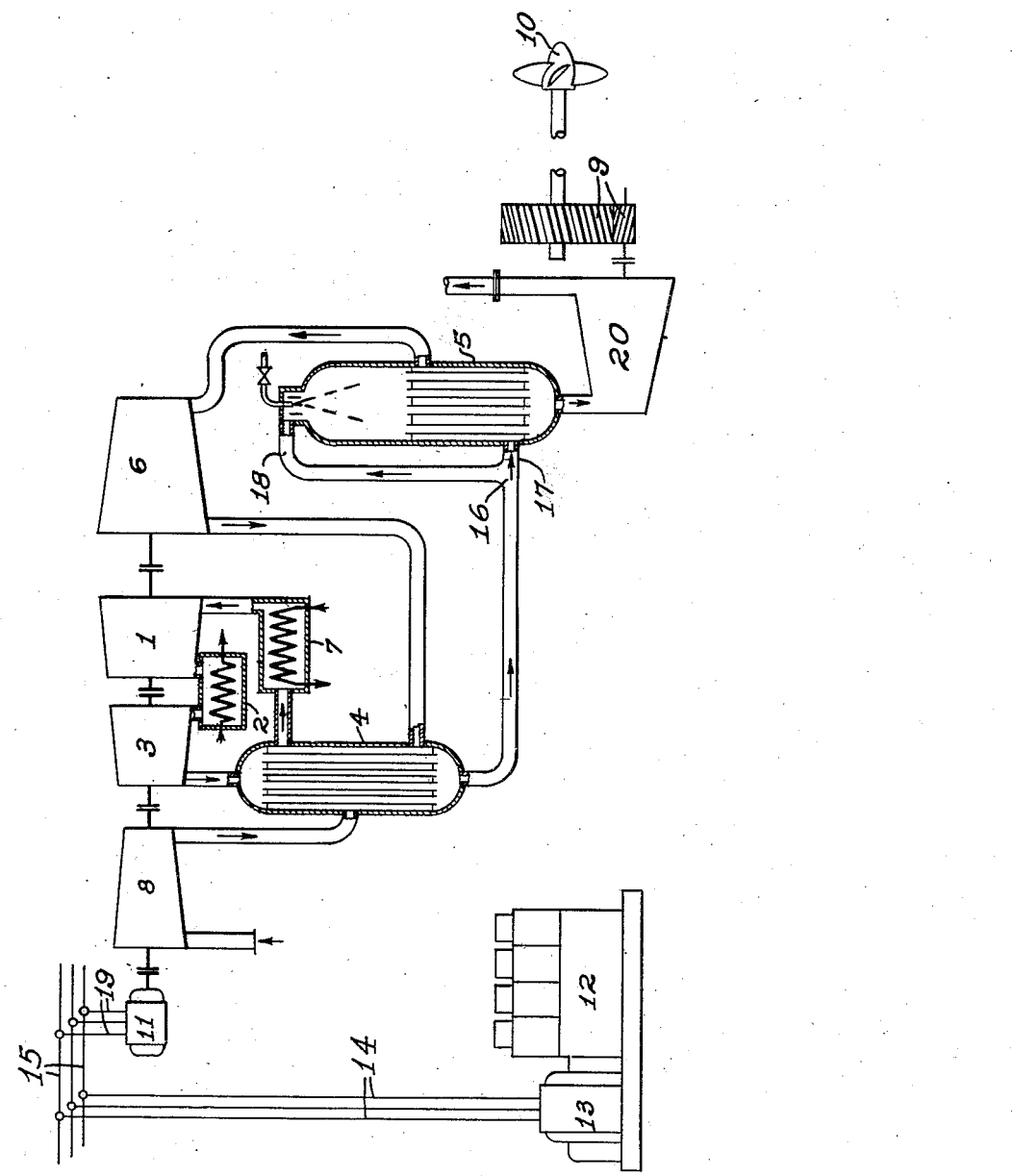
Inventor:
René Strub
By Karl A. Mayr
Attorney Patented Aug. 13, 1946

2,405,676

UNITED STATES PATENT OFFICE 2,405,676

MARINE POWER PLANT

René Strub, La Chaux-de-Fonds, Switzerland

Application May 1, 1944, Serial No. 533,605

9 Claims. (Cl. 290—4)

The invention relates to a marine power plant comprising a gas turbine plant intended for propulsion and a power plant for generating electric current. The invention is characterised in having an arrangement for the transmission of energy between the propelling plant and the generating plant.

It is expedient for the compressor set of the gas turbine plant to be connected up to the transmission system. The compressor set may be equipped, for instance, with an auxiliary electric motor which is connected up to the network of the generating plant, preferably permanently. The auxiliary motor may be designed as a synchronous machine and at the same time serve as starting motor for the gas turbine plant.

A marine power plant embodying the invention is shown in simplified form in the drawing.

The whole plant is divided into a gas turbine plant for propelling the ship and a power plant for generating electric current for the ship's requirements.

The gas turbine plant works with a circulating working medium, for instance air, which is first compressed, then heated and finally expanded so as to do useful work. The working medium compressed by the low-pressure compressor 1 passes through the intermediate cooler 2 to the high-pressure compressor 3 and then, after having been brought up to the highest working pressure, is preheated in the tubes of the heat-exchanger 4.

At the point 16 in the outlet pipe from the heat-exchanger the working medium is divided. A part of it passes through pipe 17 into the heater 5 where it flows over the heat-exchange tubes and is brought up to the maximum working temperature. The compressed and heated working medium then passes into the turbine 6, expands there and flows into the space surrounding the tubes of the heat-exchanger 4, where it gives up part of its residual heat to the working medium coming from the compressor 3. A further part of the residual heat is led off by a cooling-medium in the cooler 7, whereupon the working medium again flows to the low-pressure compressor 1 and recommences the circuit.

The other part of the working medium after diversion at the point 16 is withdrawn from the circuit and supplied through the pipe 18 to the burner of the gas heater 5 as combustion air. The combustion gases flow through the heat-exchange tubes and then pass to the turbine 20 from which they may exhaust to the atmosphere.

The compressor 8 continually supplies air from the atmosphere to the open circuit in the plant to replace the quantity withdrawn. This make-up quantity is introduced into the heat-exchanger 4 at a point at which the working medium flowing back from the turbine 6 is at approximately the same temperature as the make-up quantity.

The turbine 6 operated by the working medium in the circuit drives the compressors 1, 3 and 8, while the useful output turbine 20 operated by the quantity withdrawn drives the propeller 10 of the ship through a gear 9. The compressor set 1, 3, 8 is coupled to an electric motor 11 which serves as starting motor and also as auxiliary for equalising excesses or deficiencies of power.

Apart from the gas turbine plant intended for driving the propeller, the ship posseses a further power plant for generating electric current. The internal combustion engine 12 of this generating plant drives a generator 13 which is connected by the leads 14 to the electric mains 15 of the ship.

The auxiliary electric motor 11 of the gas turbine plant is also connected up to the electricity mains 15 by the leads 19. Any excess power of the compressor plant 1, 3, 6, 8 can be transmitted to the mains 15, and when there is any deficiency of power the supplementary power required can be drawn from the mains 15. During starting of the gas turbine plant energy is also supplied from the mains 15 to the auxiliary electric motor 11, which drives the compressor plant until the working medium in the circuit is alone sufficient to keep the gas turbine plant running.

The advantage offered by the plant described consists in that the compressors can be run at the most favourable speed whatever the load.

I claim:

1. A marine power plant comprising a main gas turbine producing power for ship propulsion, a gas producer connected with and supplying operating gas to said gas turbine, an electric generator driven independently from said main gas turbine, an air compressing plant connected with and supplying high pressure combustion air to said gas producer and comprising a hot air turbine operating said compressing plant and exhausting air thereinto and comprising an electric motor electrically connected with and receiving power from said electric generator and adapted to operate said compressing plant.

2. A marine power plant comprising a main gas turbine driving the means for propelling the ship, a gas producer comprising an air heater and being connected for gas flow with and supplying operating gas to said turbine, an electricity generating unit driven independently from said gas turbine, an air compressing plant connected with and supplying high pressure air to said air heater and high pressure combustion air to said gas producer and comprising a hot air turbine connected for air flow with and operated by high pressure air heated in said air heater and comprising electric motor-generator means electrically connected with said electricity generating unit and receiving power therefrom for starting or boosting said air compressing plant and generating electricity from surplus power available from said hot air turbine.

3. A marine power plant as set forth in claim 2, said air compressing plant comprising an auxiliary air heater connected to and heated by air exhausting from said hot air turbine and connected to and heating air compressed in said air compressing plant.

4. A marine power plant as set forth in claim 2, said air compressing plant comprising an auxiliary air heater connected to and heated by exhaust air from said hot air turbine and being connected to and supplying said exhaust air, cooled in said air heater, to said compressing plant to be compressed therein.

5. A marine power plant as set forth in claim 2, said air compressing plant comprising an auxiliary air heater connected to and heated by air exhausting from said hot air turbine and an air compressor connected to and driven by said hot air turbine and connected to and delivering air to said air heater to be heated therein before going to said gas producer.

6. A marine power plant as set forth in claim 2, said air compressing plant comprising an auxiliary air heater connected to and heated by air exhausting from said hot air turbine, an air compressor connected and driven by said hot air turbine and connected to and delivering air to said air heater to be heated therein before going to said gas producer, and comprising an additional air compressor receiving air from the atmosphere and delivering it through said auxiliary air heater to said first mentioned air compressor and being connected to and driven by said hot air turbine.

7. A motive power producing system comprising a gas turbine plant including a turbine producing said motive power and turbine-driven compressing means for raising the pressure of the medium for operating said turbine, and a supplemental power producing and receiving system connected with said compressing means for supplying power thereto and receiving surplus power therefrom and comprising a power producer operated independently from said turbine plant.

8. A motive power plant comprising a turbine producing said motive power, a producer of hot high pressure operating fluid for said turbine, an electric generator driven independently from said turbine, a fluid compressing plant connected with and supplying a high pressure fluid to said producer and comprising a turbine connected for fluid flow with and driven by hot high pressure fluid from said producer and comprising an electric motor electrically connected with and receiving power from said electric generator.

9. A motive power producing system comprising a turbine plant including a turbine producing said motive power and turbine-driven compressor means for raising the pressure of the operating medium for said turbine, and a supplemental power producing and consuming system including an electric generator driven independently from said turbine plant and an electric motor-generator electrically connected with said electric generator and mechanically connected with said turbine-driven compressor means and supplying power thereto and receiving surplus power therefrom.

RENÉ STRUB.